Sept. 29, 1953 — M. HENTER — 2,654,037

SUPPORT FOR FIELD COILS OF DYNAMOELECTRIC MACHINES

Filed Jan. 17, 1951

Inventor
Mathias Henter
by T. Lloyd LaFave
Attorney

Patented Sept. 29, 1953

2,654,037

UNITED STATES PATENT OFFICE 2,654,037

SUPPORT FOR FIELD COILS OF DYNAMO-ELECTRIC MACHINES

Mathias Henter, Brookfield, Wis., assignor to Allis-Chalmers Manufacturing Company, Milwaukee, Wis.

Application January 17, 1951, Serial No. 206,447

6 Claims. (Cl. 310—194)

This invention relates to coil supports for the field coils of dynamoelectric machines and more particularly to such supports for field coils mounted on the rotatable member of the machine. These supports brace the coils against centrifugal force due to rotation of the rotor.

Known means for bracing the adjacent sides of field coils generally comprise integrally joined brace plates defining wedge shaped clamps which are secured in position by a plurality of longitudinally spaced bolts. These bolts project radially through the clamp, being suitably insulated from the sides of the coils, and engage tapped holes in the rotor. The required cross sectional area of the bolts frequently necessitate machining of the adjacent copper of the radially inner turns of the coils to provide clearance for the bolts and their insulation. Such coil clamp construction also necessitates the removal of the rotor from its stator in order to remove the coil clamps. Furthermore, such coil clamp construction impedes the axial flow of ventilating gas along the rotor between adjacent field coils.

These disadvantages are obviated by the present invention wherein each coil clamp comprises two brace plates which are secured by a single axially and radially extending member of relatively narrow cross section.

It is therefore an object of this invention to provide an improved support for the coils of a rotating field of a dynamoelectric machine.

Another object of this invention is to provide a support for rotor field coils of a dynamoelectric machine which support may be applied or removed while the rotor is disposed within its associated stator.

Another object of this invention is to provide a support for rotor field coils of a dynamoelectric machine permitting reduced spacing between adjacent coils without interfering with the coil copper.

Objects and advantages other than those above set forth will be apparent from the following description taken with the accompanying drawing, in which.

Figure 1:
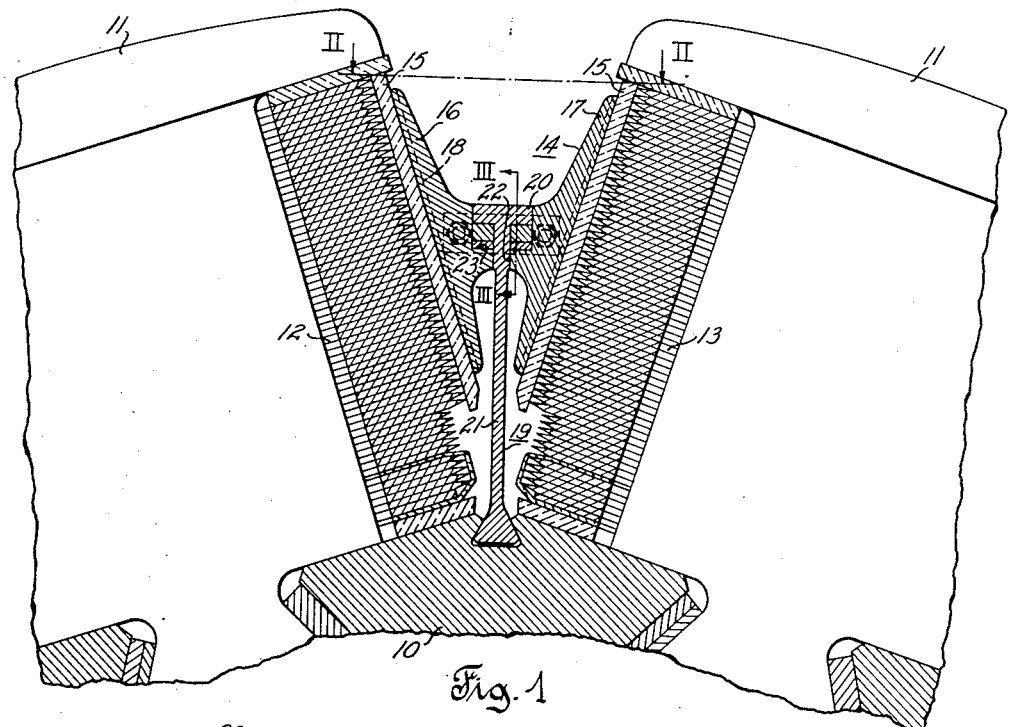
Fig. 1 is an axial view of a portion of a rotatable member of a dynamoelectric machine having adjacent field coils supported by a coil clamp, shown partially in cross section, built according to this invention.
Figure 2:
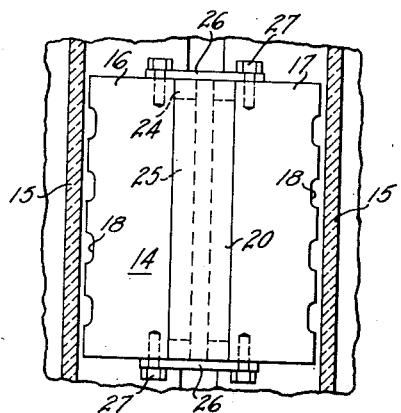
Fig. 2 is a view in cross section taken along the line II—II of Fig. 1.
Figure 3:
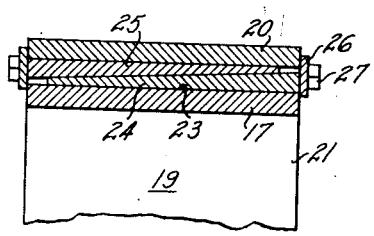
Fig. 3 is a view in cross section taken along the line III—III of Fig. 1.

Referring more particularly to the drawing by characters of reference, numeral 10 indicates the core of a rotatable member such as a field magnet having a plurality of polar projections 11 of which only two are shown. The field coils of the rotor include two adjacent coils 12, 13 associated with adjacent polar projections.

A suitable number of rotor coil clamps such as clamp 14 brace substantial areas of the central portions of the adjacent sides of the field coils against stresses due to centrifugal force. Insulating strips 15 protect the field coils from damage and from grounding. Clamp 14 comprises brace plates 16 and 17 which abut the insulating strips 15 for bracing the coils 12 and 13, respectively. The surfaces of the plates 16, 17, abutting strips 15, have radial grooves or notches 18 for the passage of ventilating gas therethrough. The plates 16, 17 are held in position by a retainer 19 having a relatively narrow cross section and a length corresponding to the length of the plates 16 and 17. Retainer 19 may be secured along its radially inner or bottom portion to the rotor core by any suitable means such as the dovetail mounting shown.

The retainer 19 has a flange 20 along its radial outer or top portion, and a web or narrow rib structure 21 intermediate its top and bottom portions. Particularly of narrow cross section is that portion of the web 21 which is adjacent the radially inner turns of the adjacent coils.

The top portion or flange 20 and the web 21 of the retainer jointly have a substantially T-shaped cross section. Vertical surfaces 22 of the plates 16, 17 abut the side surfaces of the web 21. The plates have axial or longitudinal shoulders 23 in their adjacent surfaces to define a channel for receiving the flange 20. Oppositely tapered keys 24, 25 are forced into the axial space between shoulder 23 of plate 16 and the web 21 and flange 20 of the retainer. Similarly, other oppositely tapered keys 24, 25 are axially inserted between the shoulder 23 of plate 17 and the web 21 and flange 20 of the retainer. When the keys 24, 25 are axially forced into position, the wedging action forces the plates 16, 17 radially downward to cause them to rigidly brace the adjacent sides of coils 12, 13. Covers 26 may be secured by bolts 27 to both ends of the brace plates to bear against the ends of keys 24, 25 to prevent accidental removal thereof.

Plates 16 and 17 may be removed while the rotor is disposed within its associated stator. To remove plates 16 and 17, the covers 26 and the keys 24, 25 are axially removed to release the pressure of the plates on the coils 12, 13. With the keys 24, 25 removed, the plates 16, 17 may be axially removed.

Figure 4:
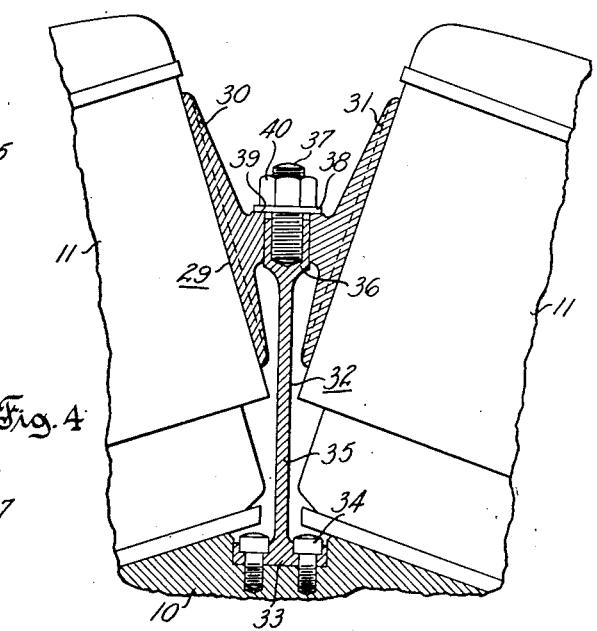
Fig. 4 is an axial view of a portion of the rotatable member of a dynamoelectric machine having another form of coil clamp according to this invention.

Coil clamp 29, Fig. 4, may also be removed without requiring removal of the rotor from its associated stator. Coil clamp 29, like clamp 14, is a split clamp which comprises a pair of plates 30, 31 for bracing the adjacent sides of adjacent field coils. The brace plates 30, 31 are separated and secured by a retainer 32. Retainer 32 extends axially and radially and has a flanged bottom portion 33 recessed in a notch or groove in the rotor core 10 and fastened thereto by bolts 34 along the length of the flange. The web 35 is of relatively narrow thickness particularly between the radially inner turns of the adjacent coils. Web 35 extends radially between adjacent coils to the plates 30, 31. Between plates 30, 31 the top portion 36 of the retainer is flanged or broadened and presents vertical side surfaces abutting vertical surfaces of the plates 30, 31. The top portion 36 of the retainer does not extend radially beyond the plates. Stud bolts 37 longitudinally spaced in the top portion 36 extend radially therefrom. Washers 38 may be disposed over the studs 37 or an equivalent apertured plate may be used instead to seat on shoulders 39 of both plates 30, 31. Nuts 40 threaded on studs 37 bear against washers or plate 38 to force the brace plates 30, 31 radially inward to rigidly brace the coils.

Plates 30, 31 may be removed without requiring the removal of the rotor from its associated stator. The plates 30, 31 may be axially removed from between the coils when the nuts 40 are sufficiently unscrewed to release the pressure on the plates.

Although but two embodiments of the present invention have been illustrated and described, it will readily be apparent to one skilled in the art that various changes and modifications may be made therein without departing from the spirit of the invention or from the scope of the appended claims.

It is claimed and desired to secure by Letters Patent:

1. In a dynamoelectric machine, a rotatable member comprising two adjacent radially disposed polar projections, each said polar projection having a field coil disposed thereon, each said field coil comprising a radially outer portion and a radially inner portion, and a coil clamp disposed between said polar projections for bracing adjacent sides of said outer portions of said coils, said clamp comprising a pair of separate plates applied to only said outer portions of said coils and a retainer, said retainer comprising a head portion and a relatively narrow shank, said retainer being secured to said rotatable member at a point intermediate said polar projections, said shank extending radially and axially between said plates and between said inner portions of said coils, said inner portions of said coils having a smaller transverse cross section than said outer portions of said coils to provide axial ventilating ducts between said coils and the radially inner portion of said shank, said plates being separated by said shank, and means cooperating with said head portion of said retainer to force said plates only radially inward for rigidly bracing only said radially outer portions of said coils.

2. In a dynamoelectric machine, a rotatable member comprising two adjacent radially disposed polar projections, each said polar projection having a field coil disposed thereon, each said field coil comprising a radially outer portion and a radially inner portion, and a coil clamp disposed between said polar projections for bracing adjacent sides of said outer portions of said coils, said clamp comprising a pair of separate plates applied to only said outer portions of said coils and a T-shaped retainer, said retainer comprising a head portion and a relatively narrow shank, said retainer being secured to said rotatable member at a point intermediate said polar projections, said shank extending radially and axially between said plates and between said inner portions of said coils, said inner portions of said coils having a smaller transverse cross section than said outer portions of said coils to provide axial ventilating ducts between said coils and the radially inner portion of said shank, said plates being separated by said shank and having shoulders formed therein adjacent said head portion of said retainer, a set of oppositely tapered keys axially wedged between the underside of said head portion and said shoulder on one of said plates, another set of oppositely tapered keys wedged between the underside of said head portion and said shoulder on the other of said plates, the wedging of said keys forcing said plates radially inward for rigidly bracing only said radially outer portions of said coils, each said set of keys being independently removable whereby one of said plates is axially removable without removing said retainer or said other set of keys and said other plate.

3. In a dynamoelectric machine, a rotatable member comprising two adjacent radially disposed polar projections, each said polar projection having a field coil disposed thereon, each said field coil comprising a radially outer portion and a radially inner portion, and a coil clamp disposed between said polar projections for bracing adjacent sides of said outer portions of said coils, said clamp comprising a pair of separate plates applied to only said outer portions of said coils and a T-shaped retainer, said retainer comprising a head portion and a relatively narrow shank, said retainer being secured to said rotatable member at a point intermediate said polar projections, said shank extending radially and axially between said plates and between said coils, said plates being separated by said shank and having shoulders formed therein adjacent said head portion of said retainer, a set of oppositely tapered keys axially wedged between the underside of said head portion and said shoulder on one of said plates, another set of oppositely tapered keys wedged between the underside of said head portion and said shoulder on the other of said plates, the wedging of said keys forcing said plates radially inward for rigidly bracing only said radially outer portions of said coils, each said set of keys being independently removable whereby one of said plates is axially removable without removing said retainer or said other set of keys and said other plate.

4. In a dynamoelectric machine, a rotatable member comprising two adjacent polar projections each having a field coil disposed thereon, each said field coil comprising a radially outer portion and a radially inner portion, a coil clamp disposed between adjacent said coils for bracing the adjacent sides of only said outer portions of said coils, said clamp comprising a retainer, said retainer comprising a head portion, flange and a shank between said head portion and said flange, means securing said flange to said rotatable member with said shank extending radially between said inner portions of said coils, said inner portions of said coils having a smaller transverse cross section than said outer portions of said coils to provide axial ventilating ducts between said coils and the radially inner portion of said shank, a plate disposed between one of said coils and said head portion, another plate disposed between the other of said coils and said head portion, a plurality of longitudinally spaced stud bolts extending radially outward from said head portion, washers disposed on said stud bolts, and nuts on said stud bolts tightened to force said washers against said plates to urge said plates radially inward only and wedge said plates between said coils and said head portion for bracing said coils.

5. In a dynamoelectric machine, a rotatable member comprising two adjacent polar projections each having a field coil disposed thereon, a coil clamp disposed between adjacent said coils for bracing only the radially outer portions of the adjacent sides of said coils, said clamp comprising a retainer, said retainer comprising a head portion, a flange and a shank between said head portion and said flange, means securing said flange to said rotatable member with said shank extending radially between said coils, a plate disposed between one of said coils and said head portion, another plate disposed between the other of said coils and said head portion, a plurality of longitudinally spaced stud bolts extending radially outward from said head portion, washers disposed on said stud bolts, and nuts on said stud bolts tightened to force said washers against said plates to urge said plates radially inward only and wedge said plates between said coils and said head portion for bracing said coils.

6. In a dynamoelectric machine, a rotatable member comprising two adjacent radially disposed polar projections, each said polar projection having a field coil disposed thereon, each said field coil comprising a radially outer portion and a radially inner portion, and a coil clamp disposed between said coils, said clamp comprising a retainer and a pair of separate plates, said plates having diverging outer faces abutting the adjacent diverging sides of only the radially outer portions of said coils and having adjacent parallel faces and outer surfaces, said retainer comprising a head portion, a foot portion and a relatively narrow shank joining said head and foot portions, said rotatable member having a slot extending under said field coils intermediate said polar projections, said foot portion of said retainer disposed in said slot and secured to said rotatable member, said shank extending radially and axially between said inner portions of said field coils and said plates to provide axial ventilating ducts between said inner portions of said field coils, said shank, and said rotatable member, said head portion extending radially between said adjacent parallel faces of said plates, and means cooperating with said head portion of said retainer and said radially outer surfaces of said plates to force said plates only radially inward to cause said adjacent parallel faces of said plates to abut said retainer and said diverging outer faces of said plates to rigidly brace the adjacent diverging sides of said radially outer portions of said field coils.

MATHIAS HENTER.

References Cited in the file of this patent

UNITED STATES PATENTS

| Number | Name | Date |
| --- | --- | --- |
| 729,414 | Reist | May 26, 1903 |
| 992,548 | Dandliker | May 16, 1911 |

FOREIGN PATENTS

| Number | Country | Date |
| --- | --- | --- |
| 114,172 | Switzerland | Mar. 16, 1926 |